(12) United States Patent
Haney et al.

(10) Patent No.: US 7,873,280 B2
(45) Date of Patent: Jan. 18, 2011

(54) METHOD AND APPARATUS FOR FREE-SPACE OPTICAL INTERCONNECTS BETWEEN ARBITRARY LOCATIONS IN A FIELD USING LENSES, STEERING ELEMENTS AND A CURVED REFLECTING SURFACE

(75) Inventors: Michael W. Haney, Oak Hill, VA (US); Michael J. McFadden, McLean, VA (US); Muzammil Iqbal, San Diego, CA (US)

(73) Assignee: University of Delaware, Newark, DE (US)

( * ) Notice: Subject to any disclaimer, the term of this patent is extended or adjusted under 35 U.S.C. 154(b) by 693 days.

(21) Appl. No.: 11/611,414

(22) Filed: Dec. 15, 2006

(65) Prior Publication Data
US 2007/0139749 A1  Jun. 21, 2007

Related U.S. Application Data

(63) Continuation of application No. PCT/US2005/021467, filed on Jun. 17, 2005.

(60) Provisional application No. 60/580,400, filed on Jun. 18, 2004.

(51) Int. Cl.
*H04B 10/00* (2006.01)
*H04B 10/02* (2006.01)

(52) U.S. Cl. .................. 398/118; 398/122; 398/130; 398/131; 398/164

(58) Field of Classification Search .................. 398/118, 398/122, 124, 125, 127, 130, 131, 164
See application file for complete search history.

(56) References Cited

U.S. PATENT DOCUMENTS

| | | | | |
|---|---|---|---|---|
| 5,256,869 A | * | 10/1993 | Lin et al. | 250/201.9 |
| 5,612,171 A | | 3/1997 | Bhagavatula | |
| 5,710,652 A | | 1/1998 | Bloom et al. | |
| 5,726,786 A | * | 3/1998 | Heflinger | 398/128 |
| 5,760,950 A | | 6/1998 | Maly et al. | |
| 5,761,350 A | | 6/1998 | Koh | |
| 5,999,670 A | | 12/1999 | Yoshimura et al. | |
| 6,326,600 B1 | * | 12/2001 | Christensen et al. | 250/201.1 |
| 6,711,319 B2 | * | 3/2004 | Hoen | 385/18 |
| 6,763,052 B2 | | 7/2004 | Huang et al. | |
| 7,024,070 B2 | * | 4/2006 | Spivey et al. | 385/17 |

OTHER PUBLICATIONS

Haney et al., "An Application Specific Interconnect Fabric (ASIF) for free-space global optical intrachip interconnects," Technical Digest of the Optics in Computing Topical Meeting, Jun. 2003, pp. 105-107.
Haney et al., "Arbitrarily Configurable Optical Interconnect Fabric for Intrachip Global Communication," Proceedings of IPACK03: Intl. Electronic Packaging Technical Conference and Exhibition, Jul. 6-11, 2003, Maui, Hawaii, 11 pages.

(Continued)

*Primary Examiner*—Dalzid Singh
(74) *Attorney, Agent, or Firm*—RatnerPrestia

(57) ABSTRACT

A method and apparatus for achieving high-density and misalignment tolerant short-reach free-space optical interconnects between arbitrary locations in a field, using microlenses, steering elements and a curved reflecting surface.

10 Claims, 11 Drawing Sheets

OTHER PUBLICATIONS

McFadden et al., "Multi-Scale Free-Space Optical Interconnects for Intrachip Global Communications," Proceedings of IEEE-LEOS Summer Topical: Workshop on Optical Interconnects & VLSI Photonics, San Diego, CA, Jul. 28-30, 2004, 2 pages.

Haney et al., "Intrachip Optical Interconnects: Challenges and Possible Solutions," Proceedings of the ICO, Tokyo, Japan, Jul. 12-15, 2004, 2 pages.

McFadden et al., "Towards demonstrating multi-scale free-space optical interconnects for intrachip global communications," Proceedings of OSA 88$^{th}$ Annual Meeting, Rochester, NY, Oct. 2004, 1 page.

Baukens et al., "Design and optimization of VCSEL-based micro-optical relay systems: bringing optical information to Silicon chips," Proceedings of SPIE, vol. 445, Micro-and Nano-optics for Optical Interconnection and Information Processing, Dec. 2001, pp. 209-220.

Thienpont et al., "Demonstration of a Monolithic Micro-Optical Bridge for Free-Space Intrachip Interconnects," OSA Summer Topical Meeting on Diffractive Optics and Micro-Optics, OSA Technical Digest Series, vol. 10, 1998, pp. 108-110.

Kobrinsky et al., "On-Chip Optical Interconnects," Intel Technology Journal: Optical Technologies and Applications, vol. 8, Issue 2, May 10, 2004, pp. 129-141.

Goossen et al., "GaAs MQW Modulators Integrated with Silicon CMOS," IEEE Photonics Technology Letters, vol. 7, No. 4, Apr. 1995, pp. 360-362.

Baukens et al., "Design of free-space microlens-relay optical interconnects: A focus on optical efficiency and scalability," Proceedings 2001 IEEE/LEOS Symposium Benelux chapter, Dec. 3, 2001, 4 pages.

Co-Pending Unpublished U.S. Appl. No. 11/611,522, filed Dec. 15, 2006.

* cited by examiner

METHOD AND APPARATUS FOR FREE-SPACE OPTICAL INTERCONNECTS BETWEEN ARBITRARY LOCATIONS IN A FIELD USING LENSES, STEERING ELEMENTS AND A CURVED REFLECTING SURFACE

CROSS REFERENCE TO RELATED APPLICATIONS

This application is a continuation under 35 USC 120 of International Application PCT/US05/21467 filed on Jun. 17, 2005. International Application PCT/US05/21467 claims benefit to U.S. application Ser. No. 60/580,400 filed on Jun. 18, 2004. The entire contents of these applications are incorporated herein by reference.

STATEMENT REGARDING FEDERALLY SPONSORED RESEARCH

This invention was made with Government support. The Government may have certain rights in the invention under contract number MDA972-00-1-0023.

BACKGROUND

The number and density of integrated circuit devices that require interconnection at the intrachip level continues to grow at a furious pace in accordance with Gordon Moore's famous prediction (i.e., the number of transistors per square inch on integrated circuits has doubled every 18 months since the integrated circuit was invented). The projected increase in integration density from millions of transistors on a single chip, to billions of transistors on a single chip, presents a significant challenge for intrachip interconnection techniques. The interconnection fabric—generally classified in terms of local, intermediate and global interconnections—must deliver power, communication signals and a low-skew clock signal to each and every one of the transistors and latches over an entire integrated circuit or microchip.

Multi-level wiring schemes have thus far served satisfactorily for the on-chip interconnections discussed above. However, these multi-level wiring schemes are currently being pushed to their technological limits as the number of integrated devices on a microchip continues to grow in accordance with Moore's Law. Thus, the need for even more levels of wiring seems inevitable. However, fundamental physical limits imposed by materials, devices, circuits, and systems indicate substantial challenges in interconnection technology could conceivably halt the progress of Very Large Scale Integrated (VLSI)/Ultra-Large Scale Integrated (ULSI) circuits.

Of particular concern are the global wire interconnections that carry communication signals, clock signals, and power between remotely separated regions of an integrated circuit. The requirements for these long point-to-point intrachip global interconnections are a growing design issue for integrated circuit and microchip manufacturers. Wires in global interconnections exhibit longer resistance-capacitance timing delays, greater clock skew, and higher power dissipation than their local and intermediate interconnection counterparts. In addition, cross talk due to capacitive coupling of long adjacent global interconnections, routing inefficiencies due to blockages of vias, and the repeaters required for the global interconnections are some other issues complicating the problem of improving the performance of global interconnects. Unfortunately, wiring schemes for global interconnection wires also tend to lag behind their shorter local and intermediate interconnection counterparts in terms of technological and performance improvements.

As a result of these and other issues, experts in the semiconductor industry have predicted a need to transition to unconventional solutions, such as optical technologies, to meet the substantial challenges that are expected to arise in the area of global intrachip interconnections. Background art examples of two systems that have been designed for such global intrachip interconnections are disclosed in papers from Professor Hugo Thienpont's research group at the Vrije Universiteit Brussels in Belgium are discussed below.

An optical interconnection system was outlined in a background art reference entitled "Demonstration of a Monolithic Micro-Optical Bridge for Free-Space Intrachip Interconnects," by Thienpont et al. Thienpont et al. disclose a fabrication and proof-of-principle demonstration of a micro-optical interconnect bridge for intra-chip communication. However, the demonstration of Thienpont et al. used two levels of cylindrical lenses, and a retro-reflection scheme, and did not demonstrate the capability for arbitrary link configuration.

A second background art example is the paper entitled "Design of free-space microlens-relay optical interconnects: A focus on optical efficiency and scalability," by Baukens et al. Baukens et al. modeled and compared the performances of different microlens-relay configurations. However, Baukens et al. only modeled and compared the reflection that occurs at a flat surface and only used micro-lenses and a retro-reflection scheme to achieve folded, on-axis links. In addition, the systems modeled by Baukens et al. did not include the capability for arbitrary link configuration.

Therefore, there is a need in the art for optical interconnect systems that can be applied to the problem of global interconnects and provide for arbitrary point-to-point free-space optical link configurations to meet the requirements of such global interconnects.

SUMMARY

One embodiment of this disclosure comprises a method for optical interconnects, comprising: approximately collimating a beam from a source with a first lens; steering the beam from the first lens with a first steering element toward a predetermined location on a curved reflecting surface; reflecting the beam from the curved reflecting surface to a second steering element; re-steering the beam at the second steering element to a orientation normal to a detector; and collecting the beam with a second lens onto the detector. The first lens, first steering element and curved reflecting surface provide high-density, arbitrary, point-to-point optical interconnects. The second steering element and second lens provide misalignment tolerance. The first and second steering elements are, for example but not limited to, micro-prisms. The curved reflecting surface is, for example but not limited to, a spherically curved macro-mirror.

Another embodiment of this disclosure provides an apparatus for an optical interconnection architecture for linking arbitrary points in a field (e.g. an integrated circuit or a microchip). The apparatus for an optical interconnection architecture for this disclosure comprises at least one lens (e.g., a micro-lens), at least one steering element (e.g. a micro-prism, off-axis lens or diffraction grating), and a curved reflecting surface (e.g., a spherically curved macro-mirror). A first lens approximately collimates a beam, the first steering element steers the beam toward a predetermined location on the curved reflecting surface. After reflection from the curved reflecting surface, a second steering element re-steers the beam so that it impinges parallel to the optical axis of a microlens that collects the beam onto the detector. The combination of the first lens, first steering element and the curved reflecting surface provides high-density, arbitrary, point-to-point optical interconnects. The combination of the second steering element and second lens at the receiving end of the optical interconnect provides for misalignment tolerance.

DETAILED DESCRIPTION

Figure 1:
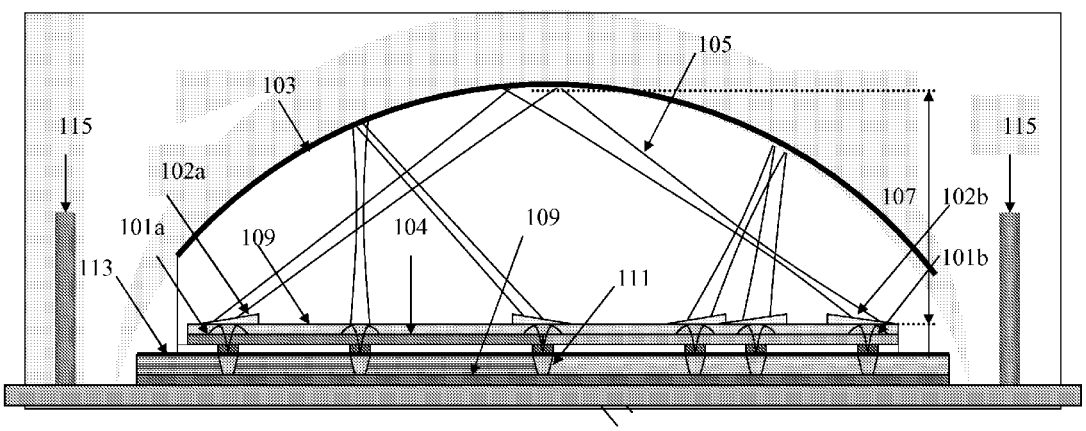
FIG. 1 is an exemplary schematic diagram of a multi-scale free-space optical interconnection system for intrachip communications.

This disclosure is directed to a method and apparatus for introducing optical interconnects at the integrated circuit or microchip level and provides arbitrary point-to-point interconnection flexibility that could effectively replace some portion of the upper layers of multi-level wiring schemes with optical interconnects. This disclosure provides a multi-scale optical approach that provides for the optical interconnection of any point in a field to any other point in the field by using a combination of refractive micro-optics and a macro-optical curved mirror. An exemplary, but non-limiting, case of a field would be an integrated circuit or microchip. This disclosure allows for an interconnection architecture/fabric that can be configured in an arbitrary manner to suit a specific interconnection application. In this sense, it may be considered an Application-Specific Interconnection Fabric (ASIF).

The Fourier Transform properties of a lens have been used in any number of optical processing applications. However, it is typically the imaging capabilities of a lens that have been seen as having application in free-space optical interconnects. Using the imaging properties of a lens as the basis of an interconnect system requires that the optical emitters and detectors be patterned symmetrically with respect to each other and the lens or lenses used. The basic optical Fourier transformation property, which maps a plane wave with some angle at the input Fourier plane onto a point at some position on the output plane, can be used to great advantage in a short-reach folded optical interconnection path across a 2-D plane, as is typified by the field of an integrated circuit or microchip. In this disclosure, micro-optics in the input Fourier plane collimate and steer beams, which are mapped by a macro-mirror to desired destinations at the output Fourier plane.

This disclosure differs from background art methods and apparatus because the optical interconnect architecture/fabric combines multiple scales of optical elements. In particular, two scales of optical elements are used in the architecture of this disclosure: (1) macro-scale and (2) micro-scale.

Macro-scale refers to an optical element that performs a single function over a multiplicity of optical channels or links within its field. In this disclosure, a macro-mirror adds optical power to the interconnection links, reducing the beam divergence for all of the channels and increasing the size of the field and the density of links over what could be achieved with micro-scale lenses and flat mirrors. In addition, the macro-mirror maps the steered beams at its input Fourier plane to desired destinations at its output Fourier plane.

Micro-scale refers to an optical element that performs some function over a single optical channel or interconnection link. The microlenses over each source approximately collimate the beams. The micro-scale steering elements (e.g., micro-prisms, off-axis lenses, or diffraction gratings) allow each of the optical links to initiate and terminate at arbitrary locations. In addition, these micro-scale steering elements provide misalignment tolerance at the receiving end of the links.

In addition, since the optical components for each channel can be fabricated in a single substrate, and there is a single macro-optical component (e.g., a spherically curved macro-mirror) for the entire field, the optical interconnect architecture of this disclosure is well suited to the batch production techniques that are typically used in semiconductor fabrication.

The architecture of this disclosure specifically targets the interconnection requirements of long, point-to-point, intrachip global interconnects, which as discussed above, are a growing design issue for microchip manufacturers. This disclosure addresses these requirements with an intrachip global communication architecture that offers a dense, arbitrarily configurable, scalable, and high-bandwidth capacity interconnection fabric/architecture.

The global wires in an integrated circuit or microchip represent a very small percentage of the total interconnects. However, these global wires contribute disproportionately to the overall delay, cross talk, power consumption and wiring complexity of the chip. Replacing these wires with optical links can reduce or alleviate these issues.

In order to provide an adequate solution, the optical architecture must have comparable power consumption and, more importantly, must be comparably flexible in terms of placement of point-to-point links. The Application-Specific Interconnection Fabric (ASIF) free-space optical interconnect architecture of this disclosure provides just such integration compatibility. Unlike background art interconnect architectures, this disclosure facilitates arbitrary point-to-point links and does not require a subordination of the electrical design to make use of a predefined set of optical paths. Any arbitrary link can be achieved by the combination of the refractive micro-optics and a macro-optics of the ASIF architecture 100, as shown schematically in FIG. 1.

There are a number of elements in this fabric/architecture that contribute to achieving a dense, misalignment tolerant and arbitrarily configured interconnection method and apparatus. These elements will be discussed in the following sections.

The unique properties of a Gaussian beam severely limit the distance over which a micro-lens can be used for collimation before the beam divergence contributes to excessive cross talk, or the lens required to capture the incident beam becomes impractically large. In order to achieve greater density of links and longer interconnect distances, many optical interconnect architectures use larger-scaled macro optics, for which these Gaussian beam diffraction-based limits on the path length are negligible.

The ASIF of an embodiment of this disclosure, as shown in FIG. 1, leverages the benefits of both the micro-optical and the macro-optical regimes. FIG. 1 shows a micro-lens 101 and a spherically curved macro-mirror 103 work in conjunction to lengthen the maximum path length between a source and a detector located on a layer above the integrated circuit or microchip 104 and, as a corollary, increase the optical link density possible over the area of an integrated circuit or microchip.

The primary purpose of the spherically curved macro-optical mirror 103 of FIG. 1 is to translate the angular information of the approximately collimated incident beam 105 into a particular position, performing a single operation for all points over the entire field. For this reason, the spherically curved macro-optical mirror 103 is positioned at a distance 107 of one focal length from the plane of the optical I/O 109 (i.e., the input Fourier plane).

A secondary purpose of the spherically curved macro-optical mirror 103 shown in FIG. 1 is the beneficial effect of extending the maximum path length of the beam 105 so that it maintains a waist size smaller than the radius of the micro-lens 101 radius, which allows it to be collected onto detector in a layer of the microchip 4 efficiently and without optical cross talk between adjacent links.

In an exemplary embodiment of the interconnect architecture, as shown in FIG. 1, the emitter and detector are located in a layer 104 at a distance 107 of one focal length from the curved mirror 105. Arbitrary point-to-point links are achieved in the following manner:

1. a surface-normal source is first approximately collimated by a micro-lens;
2. the surface-normal source is then "steered," using a micro-prism, at some angle determined to result in a particular predetermined location upon reflection from the spherically curved mirror;
3. the beam reflects from the macro-optical curved mirror towards the desired destination;
4. when the beam reaches the micro-prism array plane, shortly before reaching its destination, the beam is re-steered so that it becomes perpendicular to the plane of the chip; and
5. finally, the beam is collected by a micro-lens onto a detector.

Figure 2:
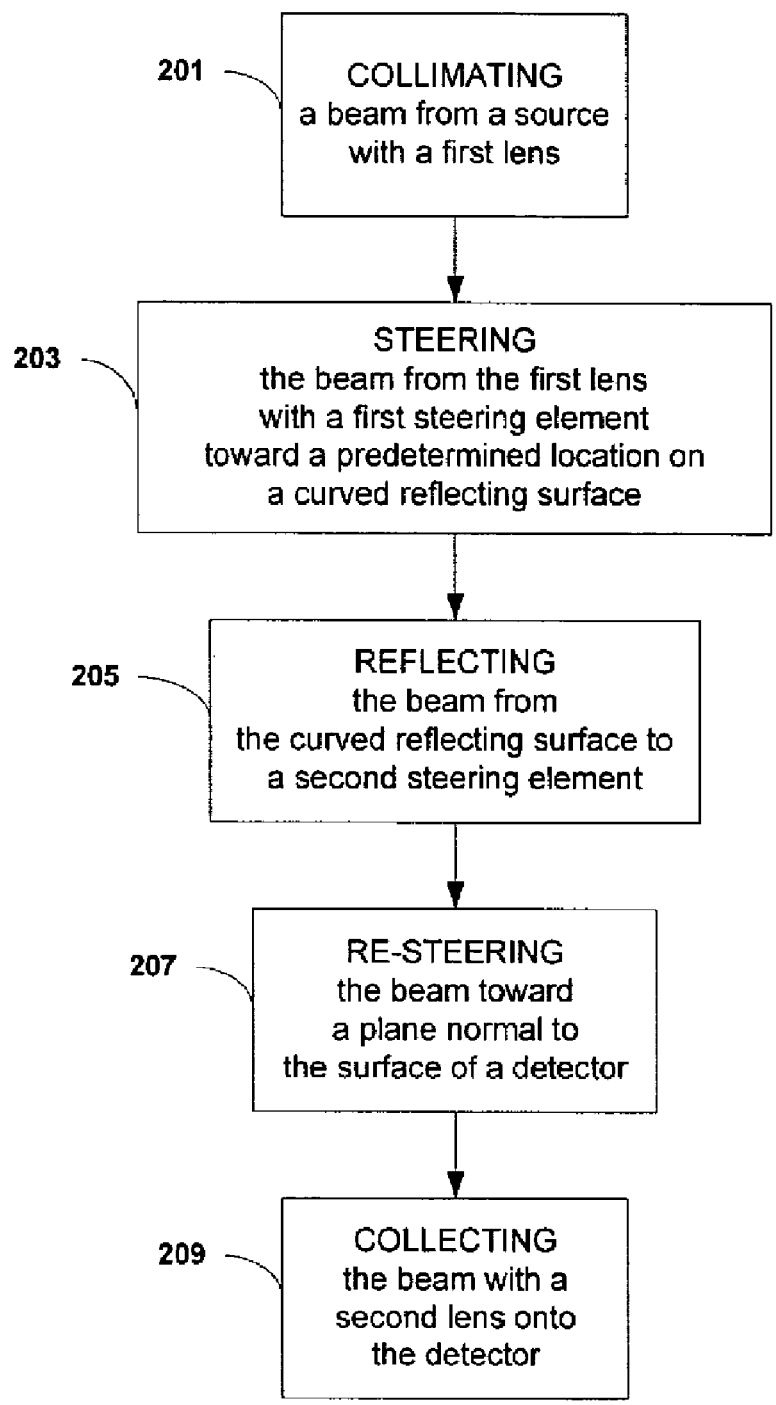
FIG. 2 is an exemplary flow diagram for a method for making multi-scale free-space optical interconnections; 207 should say "re-steering the beam to perpendicular to the surface of a detector."

FIG. 2 discloses a flow diagram for the method of this disclosure. A Gaussian beam 6 is approximately collimated with a first microlens 101a. The beam 105 is steered to a specific angle by a first micro-prism 102a so that the beam arrives at the curved reflecting surface 103 at a predetermined location. The beam 105 is reflected from the curved reflecting surface 103 and received at a second micro-prism 101b, re-steering the beam to a surface normal with the second micro-prism 101b; collecting the beam onto a detector 104b with a second microlens 101b, wherein the microlens 101a, first micro-prism 102a and curved reflecting surface 103 provide high-density, arbitrary, point-to-point optical interconnects and the second micro-prism 102b and second microlens 101b provide misalignment tolerance.

The method of establishing interconnects by steering and reflecting from a curved mirror requires that the necessary angle required to achieve a link between two points can be accurately determined with relative ease. In the ideal and/or the paraxial case, this is a trivial question. The steering angle required to achieve a link from a point on one end of the chip to a point on the other end would be the same as the angle required to reach that same point starting from the very center of the chip. The relationship between this steering angle, $\theta$, and the position, y, at which the beam becomes incident at the focal plane is governed by the paraxial equation:

$$y = f \tan \theta \quad (1)$$

Figure 3:
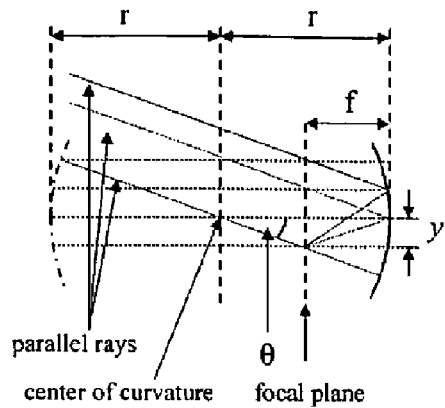
FIG. 3 illustrates the geometry of the spherically curved mirror.
Figure 4A:
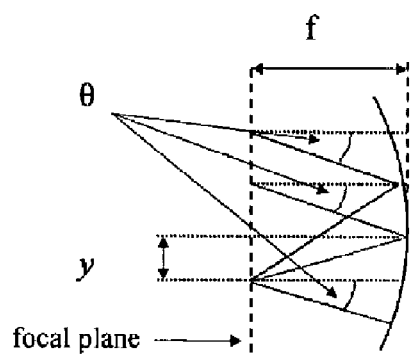
FIG. 4A illustrates the geometry of an ideal mirror in the paraxial case.
Figure 4B:
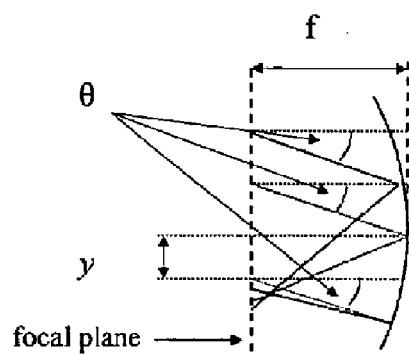
FIG. 4B illustrates the geometry of a practical mirror in the non-paraxial case.

FIG. 3 illustrates the origin of this expression in geometric optics. In the paraxial approximation for a spherically curved reflector, the position at which a ray passes through the focal plane after reflection is trigonometrically given by the angle at which it strikes the mirror and the focal length of the mirror. However, as FIG. 4A and FIG. 4B show, this paraxial approximation is not precisely accurate in the practical case. For the mirror in the non-paraxial case, the required angle to reach a particular position in this arrangement can vary significantly over a field. This is a result from focal-plane errors inherent in the paraxial approximation of the lens equation.

FIG. 4A and FIG. 4B illustrate the nature of the mismatch between the performance of the ideal and the practical.

Figure 5A:
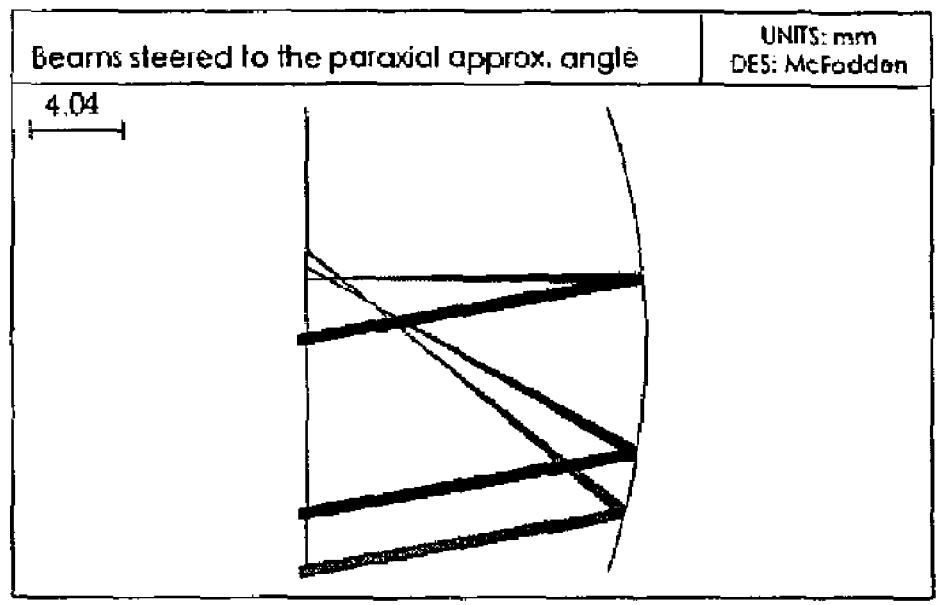
FIG. 5A illustrates the errors of the paraxial approximation.
Figure 5B:
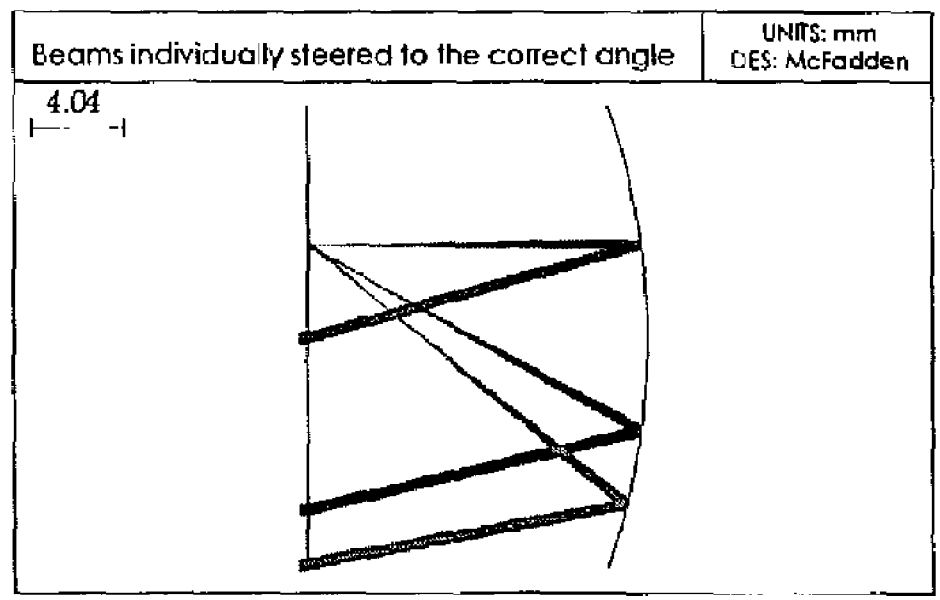
FIG. 5B illustrates removing the errors of the paraxial approximation by correcting for the case a spherically curved mirror.

However, it is not necessary to use ideal or even high-precision macro-optics in the proposed architecture. Neither is it required to restrict all links to the paraxial regime, since the actual angles required to achieve a particular optical link can easily be determined by accurately modeling an inexpensive and ordinary spherically curved mirror and using the model to determine the necessary steering angles. In the non-paraxial, non-ideal case, the angle required to reach a particular position will vary significantly from the paraxial approximation for points across the field (in this case, e.g., the chip). Fortunately, the optimal steering angles for the micro-prisms at both ends of the link can be determined with ease by designing a simple algorithm and using an optical design software package such as OSLO®. FIG. 5A and FIG. 5B show the system with errors resulting from the paraxial approximation. In particular, FIG. 5B shows the system with steering errors of the paraxial approximation corrected for the non-paraxial case.

The beam steering in the ASIF architecture is preferably done using a micro-prism. However, for many applications requiring beam steering, off-axis lenses or diffractive optical elements (DOEs) can also be used to achieve the necessary beam steering. While they are of primary utility in spectrometer applications, blazed diffraction gratings can be designed to steer monochromatic light with relative efficiency in a desired direction, using the combination of a periodic structure and a saw-tooth profile. Reducing the period of the grating structure and increasing the profile angle of the saw tooth achieves larger steering angles. These devices can be photo-lithographically patterned and etched with high precision. With even the most efficient blazed transmission grating, however, the light is steered into multiple orders, with some of the light steered in directions other than the desired angle, an effect that increases as the periodicity of the grating and approaches the minimum feature size of the etch process. However, even at relatively small steering angles, the best efficiency that could be expected of a typical blazed grating is only on the order of 80-90% in the desired direction, which may be acceptable for some applications, but may be prohibitively low for the architecture discussed here. For gratings with relatively small periodicity, the efficiency is much lower, and a large percentage of the light is steered into unwanted orders.

Figure 6A:
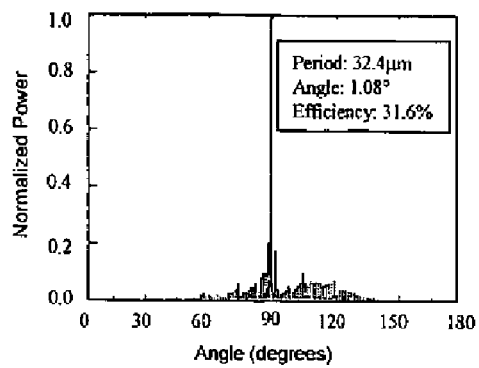
FIG. 6A illustrates diffraction efficiencies of a blazed diffraction grating for a period of 32.4 µm achieves a peak efficiency of 31.58% at a steering angle of 1.08°.
Figure 6B:
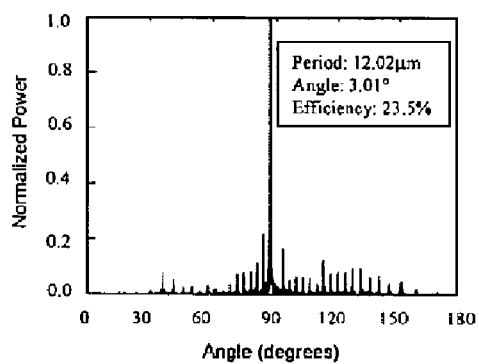
FIG. 6B illustrates diffraction efficiencies of a blazed diffraction grating for a period of 12.02 µm achieves a peak efficiency of 28.63% at a steering angle of 3.01°.
Figure 6C:
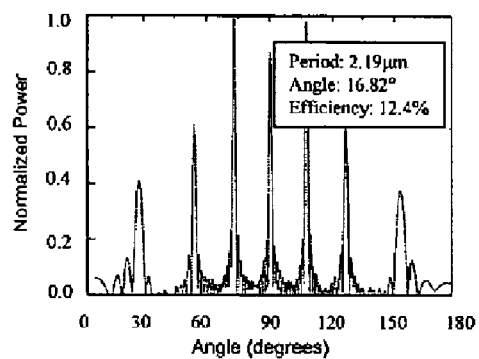
FIG. 6C illustrates diffraction efficiencies of a blazed diffraction grating for a period of 2.19 µm achieves a peak efficiency of 12.39% at a steering angle of 16.8°.

FIG. 6A to FIG. 6C show the efficiency curves for three optimized gratings, normalized to their peak efficiency. FIG. 6A shows the efficiency of an optimized blazed grating having a relatively large period. The plot shows that even for a steering angle as low as 1.08°, the efficiency in the primary order is only around 32%. For the optimized grating that achieves the slightly larger steering angle of 3.02°, shown in FIG. 6B, the efficiency drops to 28.63%. Finally, for the reasonably useful steering angle of 16.8°, shown in FIG. 6C, the efficiency in the desired direction is only 12.39%. However, in this third case, it becomes obvious that much of the light not steered in the desired direction is steered in alternative directions.

It is worth noting that in the efficiency graphs of FIG. 6A to FIG. 6B, the efficiency in the desired direction not only decreases as the steering angle is increased, but also the portion of light that is steered into undesired orders increases dramatically. It is therefore appropriate to point out the reason that the low efficiencies of diffraction gratings cannot be tolerated in the ASIF architecture is not a matter of the reduction in the amount of light that goes in the desired direction, but is rather a matter of the amount of light that goes elsewhere. The light that is steered in a direction other than the desired angle will impinge upon the incorrect detectors, creating a significant amount of optical cross talk. This is especially problematic considering the aggregate effect of a multitude of links.

In addition to these primarily important optical cross talk and efficiency concerns, the largest angle that can be reasonably achieved with a blazed diffraction grating is less than around 20°. This is only about two-thirds the practical maximum steering angle that can be obtained with ordinary glass ($n \cong 1.5$, $0.65\theta_{max} \cong 27°$). As will be discussed below, in an embodiment, the area that could be interconnected with a particular density of point-to-point links is heavily dependent on this maximum achievable steering angle. Therefore, it is preferable to use etched micro-prisms, rather than DOEs for beam steering in chip-scale optical interconnects. Etched micro-prisms have been produced in SiO2 with surface quality efficiencies >95% using true gray-scale High Energy Beam Sensitive (HEBS) glass photolithography and RIE processing. These structures have reportedly produce deflection angles greater than 40° from normal. Prisms having arbitrary compound slopes have also been demonstrated in Silicon using a similar process.

Figure 7:
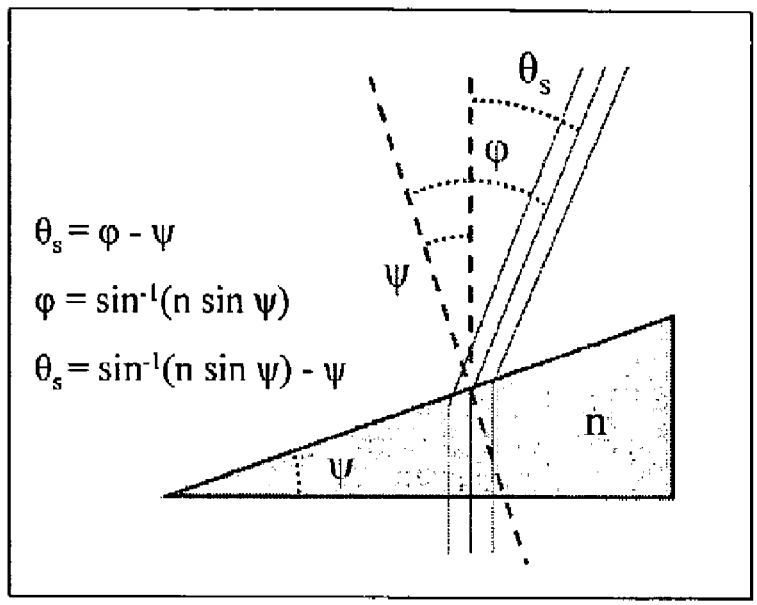
FIG. 7 illustrates the geometry of a prism, showing the relationship between internal wedge angle $\psi$, and the steering angle $\theta_s$.

FIG. 7 illustrates the geometry of a prism, showing the relationship between the internal wedge angle of the prism, and the resulting steering angle. The expression for this relationship is given:

$$\theta_s = \sin^{-1}(n \sin \psi) - \psi \tag{2}$$

where $\psi$ is the internal wedge angle of the prism and $\theta_s$ is the resulting steering angle. When the internal wedge angle of the prism, $\psi$, is increased beyond the point where the value of $\phi$ in the figure becomes 90°, Total Internal Reflection (TIR) occurs and no light is transmitted. The angle at which this occurs is known as the critical angle for TIR. The TIR-limited maximum steering angle achievable with a prism is therefore given by the equation:

$$\theta_{max} = 90° - \sin^{-1}\left(\frac{1}{n}\right) \tag{3}$$

Figure 8A:
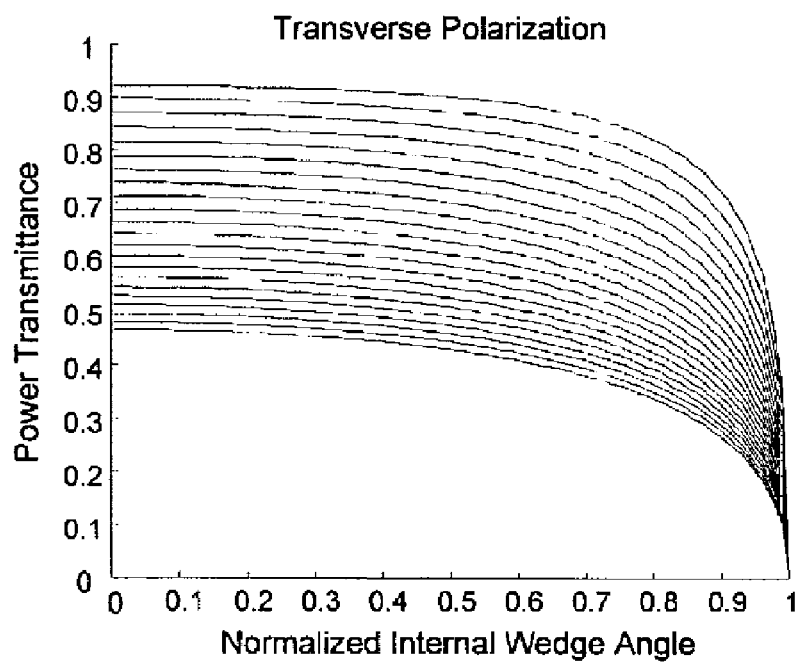
FIG. 8A illustrates Fresnel efficiency curves for prism of glass with varying indices of refraction and transverse polarization and plotted against the steering angle normalized to the TIR-limit.
Figure 8B:
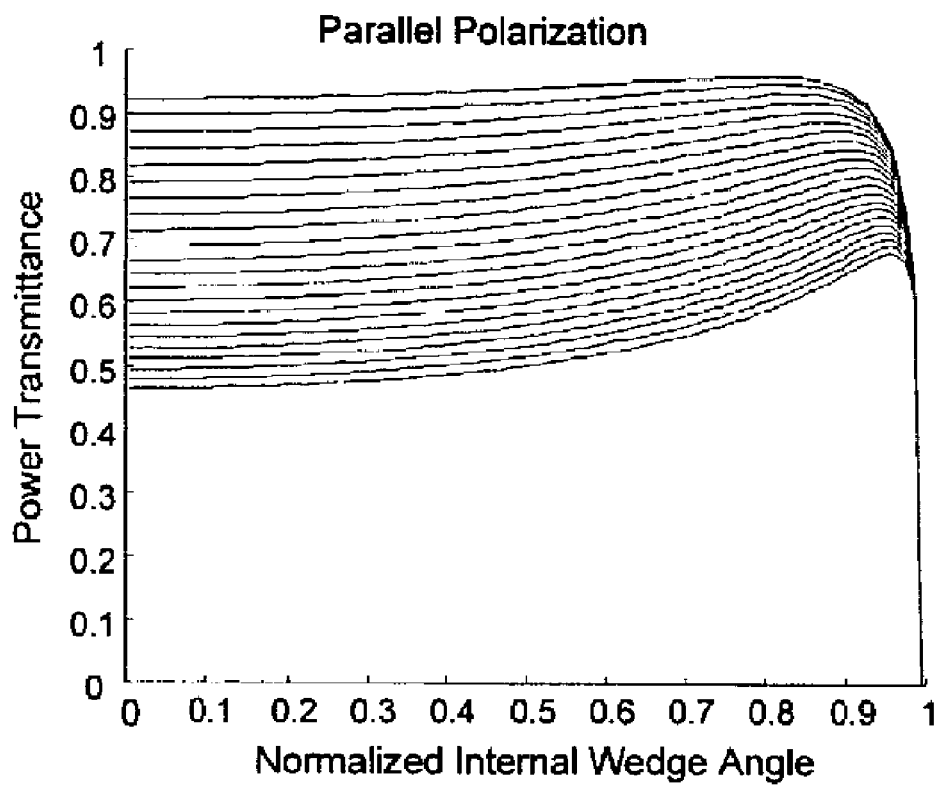
FIG. 8B illustrates Fresnel efficiency curves for prism of glass with varying indices of refraction and parallel polarization, plotted against the steering angle normalized to the TIR-limit.

This equation is derived from Snell's Law, with n being the prism glass index of refraction. It is best to avoid using angles close to this limit for reasons of optical efficiency and manufacturing tolerance. For all indices of refraction, the optical efficiency of the prism remains relatively constant over a range of internal wedge angles until it approaches about 75% of the critical angle for TIR, and materials with lower refractive indices have higher optical efficiency. FIG. 8A and FIG. 8B demonstrate this point by showing the power transmittance through the entire prism (i.e., flat and tilted surfaces) for perpendicular polarization (FIG. 8A) and parallel polarization (FIG. 8B), with indexes of refraction ranging from Fused Silica (n=1.5) to Gallium Arsenide (n=3.6), at increments of $\Delta n=0.1$. The transmittance is plotted against the internal prism angle normalized as a fraction of the critical angle for TIR. The figures clearly show that the power transmittance stays relatively constant up to about 65% of the critical angle for TIR for all indices of refraction (note: wavelength-dependent absorption is not considered here). For all cases, it appears that parallel polarization achieves higher peak efficiencies (i.e., because of the Brewster Angle for total transmission). It may not be possible to control the polarization of light used, but it is clear from these efficiency calculations that if such control were possible, the desirable polarity would be parallel.

Even without surpassing 65% of the TIR limit, angles well over 40° can be efficiently achieved using a material with a moderate index of refraction. The area that can be interconnected with the ASIF architecture depends heavily on this steering-angle, and so large angles are desirable. The relatively high efficiency and large deflection angles achievable with micro-prisms make them the obvious choice for beam steering in the ASIF architecture. It should be pointed out that, while prisms are known to introduce optical aberrations, the effect is minimized when they are used with collimated or approximately collimated light, as they are in this case. The beam remains narrowly diverging throughout the system.

Figure 9:
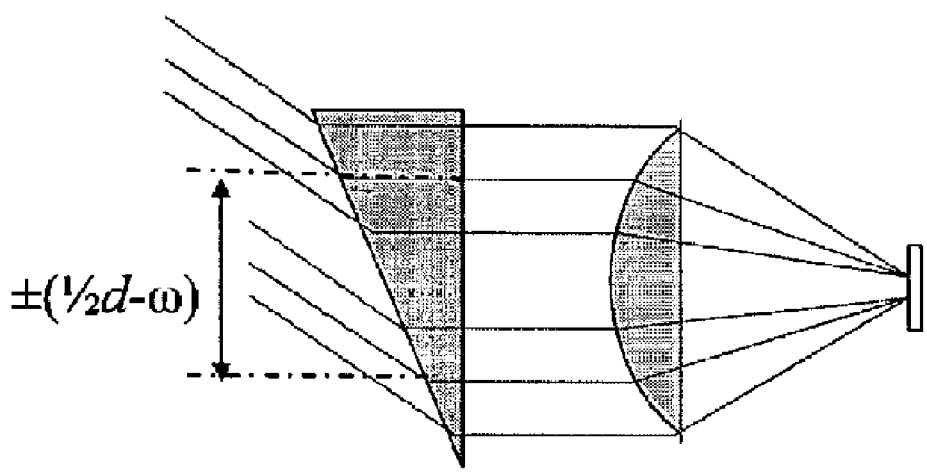
FIG. 9 illustrates the inherent misalignment tolerance of re-steering the incident beam to parallel with the optical axis of a lens.

The ASIF architecture requires rather tight manufacturing process control in the precision of the micro-prism fabrication. There is, however, a useful level of tolerance to vibrations, thermal effects, and fabrication deviations inherent in its conception. This is afforded by the second micro-prism and microlens at the receiving end of the optical link in the ASIF architecture. The micro-prism returns the incident beam to an orientation perpendicular to the plane of the chip. The second microlens then collects the incident light onto the surface of the detector. This relaxes the system in terms of tolerance to vibration, thermal effects, or misalignment, because the target of the incident beam is increased from the size of the detector to the size of the micro-prism, about an order of magnitude increase. As depicted in FIG. 9, the incident beam can be misaligned as much as $\tau=\pm(\frac{1}{2}d-\omega)$, where $\tau$ is the tolerance in position, $\omega$ is the beam waist at the micro-prism and d is the diameter of the microlens. When the base length of the micro-prism is b equal to d, the diameter of the microlens, and d was defined to be at least $2.12(2\omega)$, so that the value of this tolerance becomes $\tau \cong \pm 0.26b$. With a typical value for b, the tolerance amounts to around $\pm 50$ μm, the significance of which will be examined.

The angle necessary for reaching a destination is approximately proportional to the tangent of the steering angle times the focal length of the macro-optical focusing mirror, restated in the expression:

$$y(\theta_s) = f \tan(\theta_s) \qquad (4)$$

where y is the position of the detector with respect to the center of the chip. Therefore, the value of θs must be close enough to its prescribed value so that the beam impinges on the receiving end micro-prism within ±τ of its required location. θs depends in a non-linear way upon the wedge angle of the micro-prism ψ and the index of refraction n of the prism glass. The choice of refractive index has a strong impact on system achieving the performance requirements within the given amount of tolerance.

The misalignment tolerance of the system can be improved by correctly choosing the glass-index to match the other conditions. Using prism glass with high refractive index makes larger steering angles possible, meaning that a larger area can be interconnected with a particular density. However, for low steering angles, using high index prism material results in reduced fabrication tolerance. As the required steering angle increases, higher refractive-index materials will provide more fabrication tolerance. To maximize the system tolerance, it is advantageous to pick the index of the material so that the differential change in steering angle remains as uniform as possible over the range of desired values.

Figure 10A:
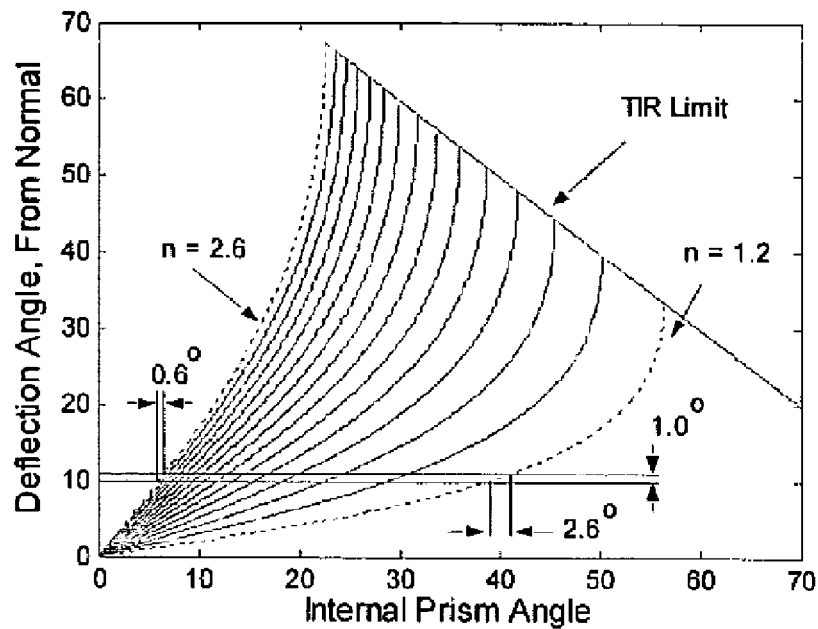
FIG. 10A illustrates steering angles resulting from changing internal prism wedge-angle for material indexes ranging from 1.2 to 2.6 with increments of 0.1.

This relationship between steering angle tolerance, prism material index and internal prism angle is illustrated in FIG. 10A. The same steering angle can be achieved with more than one type of material having different refractive indices, but the choice of refractive index has a strong impact the tolerance in the system. For example, as shown in the figure, a steering angle of 10° can easily be achieved with a prism of index either n=1.2 or n=2.6. However, the tolerance difference between these two prisms is evident in the effect on the steering angle that results from small changes in the internal wedge angle. In order to change the steering angle from 10° to 11° for the prism of index n=1.2, the prism internal wedge-angle must be increased by about 2.46°. On the other hand, with the prism of index n=2.6, the required change in internal prism angle that results in the same change in steering angle is only 0.6°, meaning that the higher index material provides less manufacturing tolerance in this range of steering angle values.

Figure 10B:
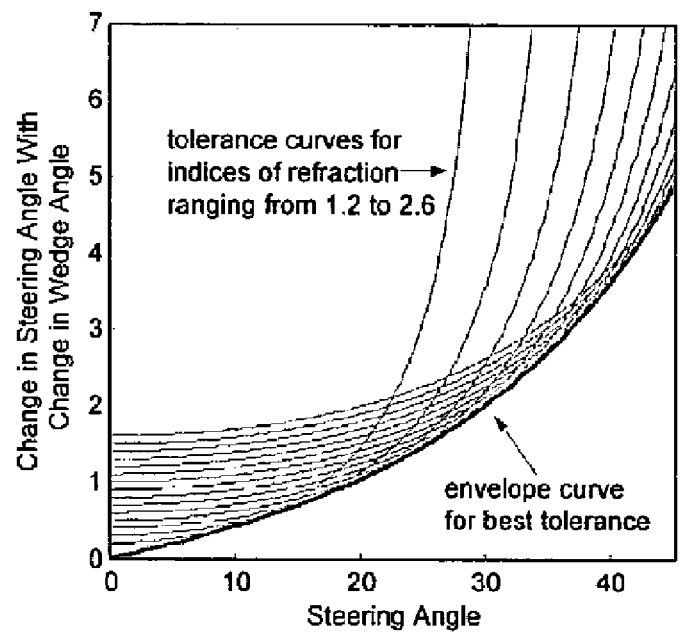
FIG. 10B illustrates the derivative of the data in FIG. 10A, showing the optimal envelope curve for manufacturing tolerance with respect to the glass index and the maximum required steering angle in the system.

It is also clear from the figure, as previously alluded to several times, that steering angles approaching the TIR limit should not be used. This is because, in addition to the efficiency considerations mentioned, the relationship between the internal wedge angle and the steering angle, which is quasi-linear for steering angles below the around 65% of the TIR-limit, becomes highly non-linear. After this point the slope of the curve becomes too steep to maintain steering angle precision. This relationship is clarified in FIG. 10B, which shows the derivatives for the family of curves in FIG. 10A with respect to the internal wedge angle ψ. The derivative dθ/dψ gives the number of degrees change in the steering angle for a change of 1° in the wedge angle. After the steering angle passes around 65% of the TIR-limit for the particular index, the tolerance for that material at that angle degrades below the tolerance of materials with higher indices. The prism glass index that provides the best tolerance for a given steering angle can therefore be determined by the "envelope" curve for all prism-glass indices, plotted and indicated in FIG. 10B. A vertical line corresponding to the maximum desired steering angle would intersect the envelope curve and derivative curve that intersects with the lowest point is that of the material with the optimum index for angles up to and including that maximum angle.

The relationships between the prism wedge angle and the steering angle tolerance, and the effects of the refractive index on this relationship have been analyzed. Clearly, inaccuracies in the steering angle propagate through the system and affect the precision with which a link can be achieved. Substituting equation (2), equation (4) can be expressed as a function of ψ, the internal wedge angle of the steering prism:

$$y(\psi) = f \tan(\sin^{-1}(n \sin \psi) - \psi) \qquad (5)$$

This expression gives the relationship between the position the receiving end of the link and the wedge angle of the prism, which is in turn a function of the relief height of the prism h and its base length b according to the simple relationship:

$$\psi = \tan^{-1}\left(\frac{h}{b}\right) \qquad (6)$$

Finally, substituting ψ into equation (5) yields an expression for the tolerance of the system with respect to the parameter most closely linked to the manufacturing process, the relief height of the prism h:

$$y(h) = f \tan\left(\sin^{-1}\left(n\sin\left(\tan^{-1}\left(\frac{h}{b}\right)\right) - \tan^{-1}\left(\frac{h}{b}\right)\right)\right) \quad (7)$$

This expression can be differentiated with respect to the prism height to determine the tolerance of the system to errors resulting manufacturing imperfections. The manufacturability and precision of the etch processes is best described in terms of the deviation in the height of the prism, and so equation (7), or rather the cumbersome derivative of this expression, can be used to verify the system tolerances to a particular manufacturing precision.

Depending on the manufacturing precision, the amount of deviation from the ideal prism height, $\delta_{prism}$ propagates through the system and results in a certain misalignment from the ideal position y. The derivative of equation (7) taken with respect to the prism relief height h gives the resulting error in position as a function of the deviation in the prism height, which can be stated as follows:

$$\frac{\partial y}{\partial h} < \frac{\tau}{\delta} \quad (8)$$

Inspection of this expression reveals that the values of $\tau$ and $\delta$ are both constants for a particular system and manufacturing process, and thus there is a maximum tolerable $\angle y/\angle h$. In equation (7), the index of refraction and the focal length of the macro mirror can be varied to achieve a wide range of values for y, theoretically limited only by the practical maximum steering angle of the micro-prism, but the tolerance-limited maximum of y occurs when its derivative, dy(h)/dh exceeds $\tau/\delta$.

The inherent misalignment tolerance in the system due to the micro-prism and microlens at the receiving end of the link was approximated to be $\tau \approx \pm(\frac{1}{2}d-\omega)$, which becomes $\pm(0.5-0.235)$ b, where b is the base length of the micro-prism, when the microlens diameter is 2.12(2$\omega$). However, this value might be altered for some gain in interconnected area for the given tolerance. The maximum area that can be interconnected within a certain tolerance is limited by the ratio of $\tau/\delta$, which the value of dy/dh cannot exceed. By increasing the size of the receiving-end microlens and micro-prism from 2.12(2$\omega$) to 3.0(2$\omega$), the tolerance can be significantly improved. In the limit, the value of $\tau$ approaches $\frac{1}{2}$b, but obviously this is not desirable, since the density of links is proportional to 1/b, and the limit naturally occurs when b is large. However, a small increase in b from 2.12(2$\omega$) to 3.0 (2$\omega$) increases the value of r from 0.26b to 0.33b, which appears to be around an increase of 25%, but is really an increase of almost 80%, because b is now 1.4 times its original value. The effect of this increase in the receiving end micro-prism base size is that the area that can be interconnected is increased, while the density of links is decreased relatively slightly.

Besides the tolerance limitation $\tau$, related to the accuracy of the position where the beam lands, and $\delta$, related to the accuracy of the prism height, there is also usually a maximum prism height that can be fabricated with a particular process. This further limits the system, since the prism index that achieves the highest tolerance for a particular steering angle, given by the envelope curve of FIG. 10B may require a profile that extends beyond the maximum height that can be fabricated. This will limit the area that can be interconnected within the given tolerance.

For the purpose of comparison and contrast, a purely micro-optical based interconnect system will be examined, to clarify the advantages of the multi-scale optical ASIF architecture in terms of point-to-point interconnect flexibility, density, and area of interconnects at the intrachip level. The maximum distance over which a Gaussian beam can be collimated and captured in full (>99% energy) by two lenses of the same prescription is achieved when the distance from the initial beam waist of the source to the first micro-lens is equal to the focal length of the lens plus the Raleigh Range of the source. This maximum separation of the lenses for a given focal length, where the imaged beam waist is at the midpoint between the two lenses of a particular focal length, depends only on the Raleigh Range of the source. For this reason, a system that achieves this paraxial, maximum and symmetric interconnect distance has been called the "Raleigh interconnect system," (e.g. by Baukens, et al.). The maximum length $L_{max}$ of interconnection for the micro-optical interconnect system is given by the expression:

$$L_{max} = 2f\left[1 + \frac{f}{2z_R}\right], \quad (9)$$

where f is the focal length of the microlens and $z_R$ is the Raleigh range of the Gaussian source, given by:

$$z_R = \frac{\pi \omega_0^2}{\lambda}, \quad (10)$$

with $\lambda$ being the wavelength of the Gaussian source, and $\omega_0$ the initial beam waist. The initial beam waist of the Gaussian source is not directly measurable. However, it is related to the far-field angular divergence of the Gaussian source by the following approximation:

$$\omega_0 = \frac{\lambda}{\pi \theta_{ff}}, \quad (11)$$

where $\theta_{ff}$ is the far-field angular divergence of the Gaussian source, a directly measurable parameter. Using this method, $\theta_{ff}$ uniquely determines all the beam properties.

Figure 11:
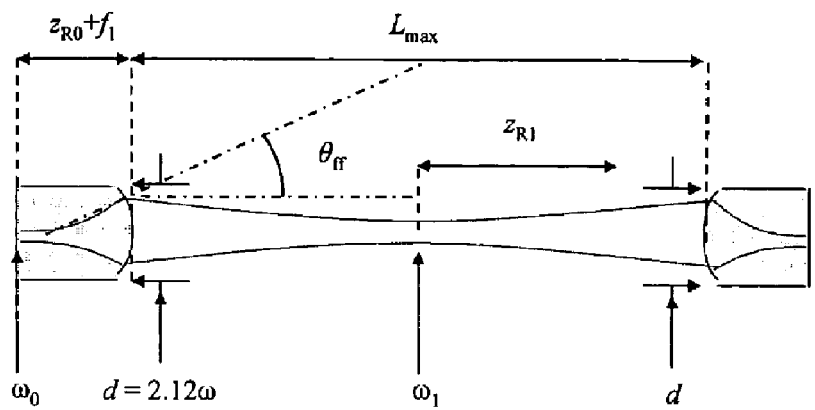
FIG. 11 is a diagram of a micro-optical interconnect system.

The micro-optical interconnect system is schematically depicted in FIG. 11. As alluded to above, the optimal interconnect length $L_{max}$ is achieved when the lens is placed at a distance of ($z_R$+f) from the beam waist of the source, as shown in the FIG. 11. For simplicity, in this symmetric system, the lenses are considered to be identical. Also, in order for the equations given here to be valid, the diameter d of the lens must be large enough to prevent clipping effects on the Gaussian beam at the transmitting side (i.e., left side of FIG. 11). If the diameter of the lens is 2.12 times the size of the beam waist diameter (i.e., 1/$e^2$ normalized intensity point=2$\omega$), clipping effects are considered to be negligible (<0.1%). Thus, the value of the diameter, d, is determined by the divergence of the beam waist at the location of the first lens, according to the expression:

$$d = 2.12 \cdot 2\omega_0 \sqrt{1 + \left(\frac{f_1 + z_{R0}}{z_{R0}}\right)^2} \quad (12)$$

The diameter of the lens combined with the maximum interconnection length for the Raleigh interconnect system jointly determines both the maximum interconnect-density and the maximum microchip area over which this density can be achieved for the purely micro-optical folded interconnect system. While the maximum microchip area depends on the geometry of the architecture, the maximum density of links is simply determined by the area consumed by the space allotted for both the transmitting and receiving end micro-lenses. Thus, the maximum density of links is given by the following expression:

$$D = \frac{1}{17.977\omega_0^2 \left[1 + \left(\frac{f_1 + z_{R0}}{z_{R0}}\right)^2\right]} \quad (13)$$

Figure 12:
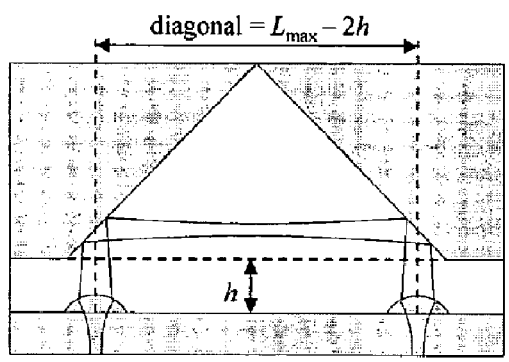
FIG. 12 is a diagram of a retro-reflector micro-optical interconnect system.
Figure 13:
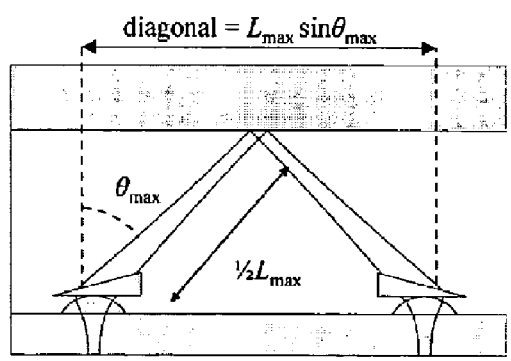
FIG. 13 is a diagram of a steered flat mirror micro-optical interconnect system.

The impact of the geometry of the interconnect architecture specifications on the area-density tradeoff is considered for two canonical folded-planar interconnect architectures based on the micro-optical interconnect system. The two systems considered shall be referred to as the "retro-reflector based" folded interconnect system, shown in FIG. 12, and the "steered flat-mirror based" folded interconnect system, as shown in FIG. 13. With micro-prisms used to steer the beams in arbitrary directions, the steered flat-mirror based system offers more design flexibility. However, it will be shown that the retro-reflector based system can provide greater interconnect density for the same chip area than the steered flat-mirror based system.

Figure 14:
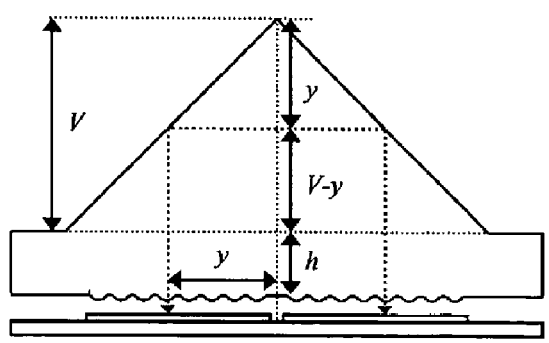
FIG. 14 is a diagram of the geometry of the retro-reflector-based micro-optical interconnect system for 16 point-to-point links.

For both micro-optical interconnect systems considered, the density of links and the maximum path length of the longest link are both functions of the focal length of the micro-lens according to equations (9) and (13). Thus, there is a maximum chip area that can be linked with any given density, due to the maximum path length, which varies according to the interconnect architecture geometry. No demonstrated example of the steered flat mirror-based micro-optical interconnect system is known. However, the retro-reflector-based system has been demonstrated for 16 point-to-point links by in the background art system of Baukens discussed above. The geometry of this demonstrated system is shown in FIG. 14 to illustrate the parameters used. By inspection of FIG. 14, it can be seen that the paths for all of the links in the retro-reflector based system are of the same length, $L_{max}=2(h+(V-y)+y)=2(V+h)$. Thus, the diagonal of the maximum chip area that could be interconnected with the retro-reflector based system would be ($L_{max}-2h$), as shown in FIG. 12. The density of interconnects over this area is given by the diameter of the micro-lens required to achieve this maximum path length, $L_{max}$.

The maximum subtended area for the two geometries considered in FIG. 12 and FIG. 13 are therefore given by the following relationships:

$$A_{retroreflector} = \frac{(L_{max} - 2h)^2}{2} \quad (14)$$

-continued $$A_{steered} = \frac{(L_{max} \sin\theta_{max})^2}{2} \quad (15)$$

where h and $\theta_{max}$ are as shown in the figures.

In the limit, where h approaches 0 and $\theta_{max}$ approaches 90°, both of these equations reduce to the simplified maximum of $A=0.5L_{max}^2$. As shown in FIG. 14, though, the only demonstrated version of the retro-reflected-based Raleigh system uses a non-zero h, owing perhaps to the difficulties in fabrication associated with reducing h to zero. In that architecture, h was around $0.15L_{max}$, reducing the maximum subtended area of the system from $0.5L_{max}^2$ to around $0.245L_{max}^2$. However, the flat-mirror-based architecture is similarly restricted to a fraction of the theoretical limit by the maximum steering angle of the micro-prisms, which cannot exceed the limit imposed by the critical angle for Total Internal Reflection (TIR).

Using Snell's Law, the maximum steering angle $\theta_{max}$ that can be achieved with a prism is derived and given by the relationship:

$$\theta_{max} = 90° - \sin^{-1}\left(\frac{1}{n}\right), \quad (16)$$

where n is the index of refraction of the prism material. For example, Sapphire has an index of refraction, $n \approx 1.77$, so that the TIR-limited $\theta_{max}$ is around 55°. This would reduce the theoretical maximum area of the flat-mirror-based Raleigh optical system from $A=0.5L_{max}^2$ to $A=0.34L_{max}^2$. However, this theoretical maximum steering angle is much larger than the practical maximum. Thus, it is unreasonable to use the TIR limit as a realistic steering-angle maximum, and angles above around 65% of the TIR limit should not be used, as mentioned in an earlier section. Limiting the maximum steering angle to 65% of its TIR limit yields the much lower value for the maximum area subtended by the steered flat-mirror-based optical system of $A=0.17L_{max}^2$ (i.e., with sapphire used for the prism glass).

In a comparison of these two architectures based on the purely micro-optical interconnect system, the maximum area interconnected with the same density of links is greater for the retro-reflector based system, when h is given to be $0.15L_{max}$, and sapphire is used as the prism glass. However, if h is above a certain value, or if a material having higher index of refraction is used, the flat-mirror-based system may allow a larger area to be interconnected with the same density. Conversely, the same area may be interconnected with a greater density of links. A simple relationship between h and n defines the conditions when one system outperforms the other in terms of point-to-point link density for a given area. The retro-reflector-based system outperforms the steered system when:

$$h < \frac{1 - 0.65\cos\left(\sin^{-1}\left(\frac{1}{n}\right)\right)}{2} L_{max} \quad (17)$$

In this case, where $n \approx 1.77$, the value of h must be less than $0.23L_{max}$, explaining why the retro-reflector-based system outperforms the steered system in this example. With different values for h or n, the steered flat-mirror-based Raleigh system could outperform the retro-reflector-based system in terms of link density over a particular area. However, the steered system will always have the advantage of allowing arbitrary link configurations, an essential characteristic for global interconnects at the intrachip level.

The discussion of the purely micro-optics based Raleigh system gives a point of reference for an analysis of the multi-scale optical system of this disclosure. The objective is to clarify the advantage that can be gained by combining scales of optics. The ASIF architecture borrows elements from both of the Raleigh systems discussed above. However, the addition of a macro-optical element serves to boost both the performance and flexibility of the interconnect architecture. In the steered flat-mirror-based system, the steering prisms provided flexibility in the link configuration, but only over a very small area or with a very low link density. The retro-reflector-based system can be designed to performed better in terms of link density and area, but allows no interconnect flexibility. Combining these two (steering and retro-reflecting) would disrupt any density advantage of the retro-reflected system and cause its performance to degenerate into that of the flat-mirrored steering system.

Figure 15:
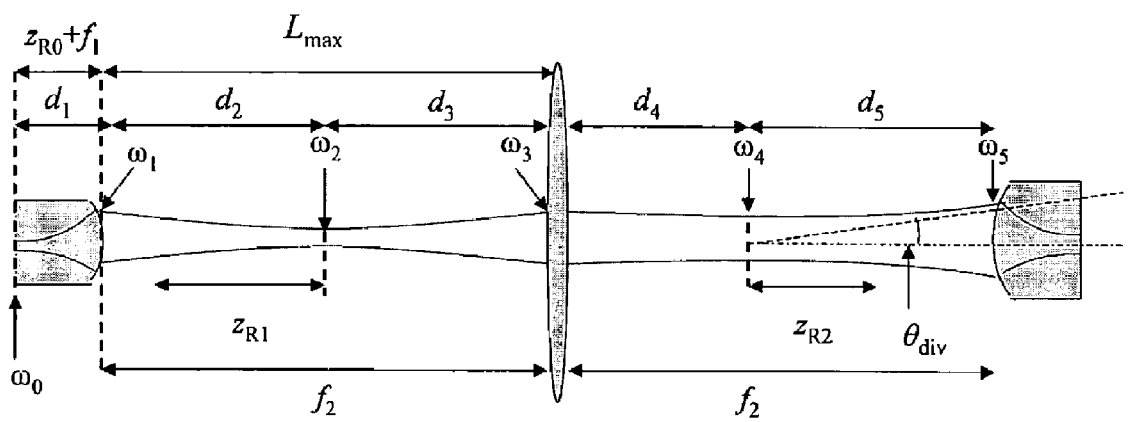
FIG. 15 is a diagram of an unfolded optical system with a macro-lens representing the effect of the spherically curved mirror.

The ASIF architecture of this disclosure uses the optical power from the spherically curved mirror to extend the maximum path length for the optical links. In the most simplistic approach, the focal length of the macro-mirror is defined to be the length $L_{max}$, given by equation (9). The macro-mirror serves to reduce the divergence of the Gaussian beam, allowing a longer effective maximum path length for the links. The unfolded optical system is shown in FIG. 15, with a macro-lens representing the effect of the spherically curved mirror. There are many relevant parameters in this system, and each is labeled in the figure.

Even though the focal length of the macro-mirror is a great deal larger than the Raleigh Range of the source $z_{R0}$, and the initial beam waist $\omega_0$, it does not collimate the beam. This is due to the fact that $\omega_2$ and $z_{R1}$, imaged by the micro-lens, are now the beam waist and Raleigh Range parameters relevant to the macro-mirror. Therefore, the macro-mirror is not at the $f_2+z_{R1}$ position from $\omega_2$, required by equation (9) for optimal collimation.

However, the macro-mirror has the positive effect of reducing the divergence of the beam from its new value of $\lambda/\pi\omega_2$, as given by the equation:

$$\theta_{div} = \frac{\lambda\sqrt{\left[1-\left(\frac{d_3}{f_2}\right)\right]^2 + \left(\frac{z_{R1}}{f_2}\right)^2}}{\pi\omega_2}, \quad (18)$$

where $d_3$ is the distance from the location of beam waist $\omega_2$ to the macro-mirror, and $f_2$ is its focal length. For simplicity, in the ASIF architecture the focal length of the macro-mirror is defined to be equal to $L_{max}$. Since $d_3$ is the distance from the imaged beam waist $\omega_2$ to the macro-mirror, it simply becomes $\frac{1}{2}L_{max}$. Substituting variables and simplifying equation (18) yields the following expression for the angular divergence of the Gaussian beam after reflecting from the macro-mirror:

$$\theta_{div} = \frac{\lambda\sqrt{\frac{1}{4}+\left(\frac{z_{R1}}{L_{max}}\right)^2}}{\pi\omega_2}. \quad (19)$$

This divergence is effective from the point of the image of the beam waist $\omega_4$ resulting from the macro-mirror, which occurs at the position:

$$d_4 = f_2 + \frac{(d_3-f_2)}{\left(\frac{d_3}{f_2}-1\right)^2+\left(\frac{z_{R1}}{f_2}\right)^2} \quad (20)$$

and is of the size:

$$\omega_4 = \frac{\omega_2}{\sqrt{\left(1-\frac{d_3}{f_2}\right)^2+\left(\frac{z_{R1}}{f_2}\right)^2}} \quad (21)$$

with the Raleigh range:

$$z_{R2} = \frac{\pi\omega_4^2}{\lambda}. \quad (22)$$

The standard beam waist propagation equation can now be used to determine the size of the beam waist at the location of the second micro-lens, denoted as $\omega_5$ in FIG. 15, and according to the equation:

$$\omega_5 = \omega_4\sqrt{1+\left(\frac{f_2-d_4}{z_{R2}}\right)^2} \quad (23)$$

The receiving end micro-lens is designed, for example, to be around 2 times bigger than $\omega_5$, to capture the majority of the incident light. Combining equations (12), (13), and (23) for the two microlens diameters yields an expression for the density of links for the ASIF architecture:

$$D_{ASIF} = \frac{1}{(2\omega_4)^2\left[1+\left(\frac{f_2-d_4}{z_{R2}}\right)^2\right]+(2.12\cdot 2\omega_0)^2\left[1+\left(\frac{f_1+z_{R0}}{z_{R0}}\right)^2\right]} \quad (24)$$

Figure 16:
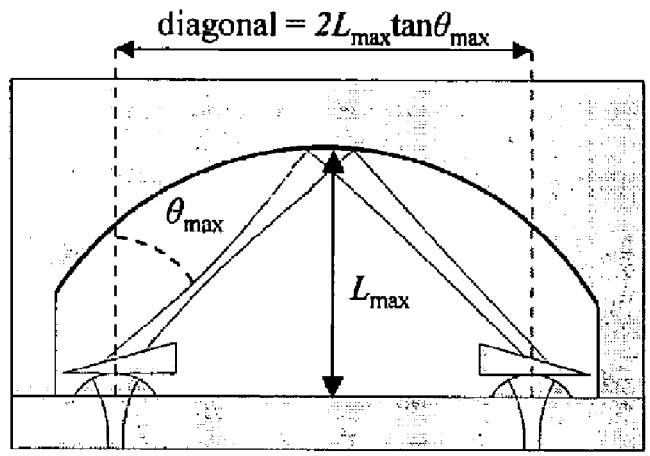
FIG. 16 is an exemplary diagram of the geometry of an embodiment.

The area over which this density is achieved can be geometrically determined by the equation:

$$A_{ASIF}=2(L_{max}\tan\theta_{max})^2, \quad (25)$$

where $L_{max}$ and $\theta_{max}$ are given by equations (9) and (16), the same equations used for the Raleigh Systems. It should be noticed that the distance $L_{max}$, given by equation (25) and shown in FIG. 16, is not actually the maximum path length traveled by the micro-lens-collimated beam in the ASIF architecture. In the system as it has been defined for the simplest case, with the focal length of the macro-mirror equal to $L_{max}$, the minimum path length from the micro-optics to the macro-mirror will be approximately equal to $L_{max}$. The path length will be larger for virtually all links except the most trivial, increasing up to a true maximum path length equal to $L_{max}/\cos\theta_{max}$. However, this does not negatively impact the density of links because the effect is to increase $d_3$, the distance from waist $\omega_2$ to the macro-mirror, in equations (18), (20) and (21 changing the location and size of $\omega_4$, and the beam divergence $\theta_{div}$. The result is actually a decrease in $\omega_5$, so that the density and area estimates in equations (24) and (16), which are based on $L_{max}$ being the maximum path length can be considered conservative.

The equations for the density and the area for the ASIF architecture are of a slightly different form than those used for the micro-optical interconnect systems, a depend on different parameters, so they cannot be directly compared to one another. However, for both types of systems, the area and density are both determined by the focal length of the micro-lens, though the dynamics of the systems with respect to this variable behave differently from one another. In both systems, the focal length of the micro-lens gives a chip area that can be interconnected with a particular density. The clearest comparison between the systems is when that maximum chip size is plotted against the maximum density. The equations governing the three systems are summarized in the following table:

useful metric for comparison between interconnect fabrics is the global bandwidth capacity per $cm^2$ across the chip.

Figure 17:
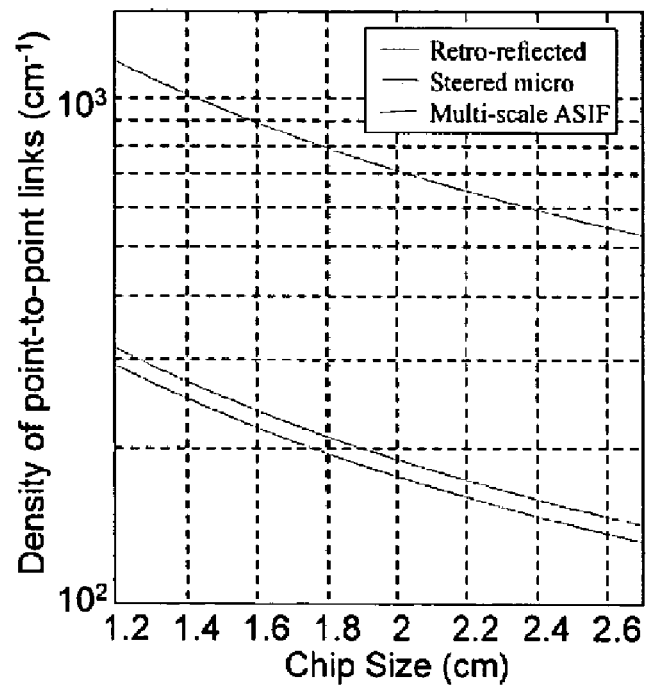
FIG. 17 is a graph comparing the chip size and density of point-to-point links for an exemplary multi-scale Application-Specific Interconnection Fabric (ASIF) system and the retro-reflected and steered mirror micro-optical interconnect systems.

The data plotted in FIG. 17 was used to generate estimates for the optical bandwidth capacities of the two configurable optical interconnect fabrics considered (micro-optical and multi-scale optical). The retro-reflected micro-optical background art system is not compared because it has no configuration flexibility, which is a necessary quality for intrachip global communications.

In addition to providing ample bandwidth capacity for global interconnects in future technology nodes, an implication of using optical interconnects for this level of communication is the removal of the necessity of repeaters for the global interconnect layers. This reduces the routing complexity of the lower metallization layers by reducing the number of via blockages and significantly reduces the real estate consumed by the repeaters.

TABLE II

Area and Density equations for three optical systems

| System | Area | Density of links |
|---|---|---|
| Retro-reflector Raliegh System | $A_{retroreflector} = \dfrac{(L_{max} - 2h)^2}{2}$ | $D_{Raliegh} = \dfrac{1}{17.977\omega_0^2\left[1 + \left(\dfrac{f_1 + z_{R0}}{z_{R0}}\right)^2\right]}$ |
| Steered Raliegh System | $A_{steered} = \dfrac{(L_{max}\sin\theta_{max})^2}{2}$ | |
| Multi-Scale ASIF System | $A_{ASIF} = 2(L_{max}\tan\theta_{max})^2$ | $D_{ASIF} = \dfrac{1}{(2\omega_4)^2\left[1 + \left(\dfrac{f_2 - d_4}{z_{R2}}\right)^2\right] + (2.12 \cdot 2\omega_0)^2\left[1 + \left(\dfrac{f_1 + z_{R0}}{z_{R0}}\right)^2\right]}$ |

FIG. 17 shows the maximum density of links achieved with the three systems plotted against the maximum chip size over which this density is possible. The prism material used in this comparison is sapphire (n≅1.77), the value of h is $0.15L_{max}$, and the far-field divergence half-angle of the source is 15°. In generating the data for this plot, the maximum steering angle is 65% of the TIR-limit.

It is clear from the comparison of these three candidate optical systems that the multi-scale ASIF system provides the interconnect flexibility of the steered micro-optical interconnection system with greater density and over a larger area than the retro-reflector based micro-optical interconnection system. For these reasons, it is reasonable to state that the combination of multiple optical scales in the ASIF architecture improves performance and functionality compared to background art optical systems having only one optical scale.

An analysis of was undertaken to quantify the performance enhancement attained by the integration of an optical interconnection system with semiconductor integrated circuits. This analysis, based on recently-developed techniques for system-level interconnect prediction, in conjunction with the 2003 ITRS, yielded wire length distributions, chip routing capacities and repeater estimates, as well as communication requirements and power consumption for near- and long-term integrated circuit technology. The results are summarized in the electrical interconnect plots of FIG. 18.

The number of global point-to-point links for various integration densities are determined from the extracted wire length distribution. The chip sizes obtained correspond to the predictions in the 2003 ITRS roadmap, ranging from 130-nm to 32-nm technologies, in accordance with Moore's Law. A In addition, it should be noted that there is an inherent inverse relationship between the maximum field size and the density of links that can be achieved over that field size. That is, there is an upper bound on the number of links in a given field/chip size. However, the overall number of links that can be achieved increases as the chip size increases.

Further, the density of links is also limited by the maximum steering angle of the micro-prism, which is related to the index of refraction of the material used. For tolerance considerations, the maximum usable steering angle is around 65% of the total internal reflection-limited maximum. Therefore, higher index materials give higher maximum steering angles, which allow higher link densities.

In summary, there is an impending disparity between required and available metal interconnect bandwidth capacity. Analysis suggests that, by replacing the global metal interconnect layers in future VLSI generations with multi-scale free-space optical interconnects, VLSI integration advancement might be able to continue without requiring an architectural paradigm shift. Of the alternatives considered, the multi-scale free-space optical interconnect system appears to offer the best promise.

The foregoing description of embodiments of this disclosure provides illustration and description, but is not intended to be exhaustive or to limit the claimed invention to the precise form disclosed. Modifications and variations are possible in light of the above teachings or may be acquired from practice of the claimed invention. The scope of the claimed invention is defined by the claims and their equivalents.

What is claimed as new and desired to be protected by Letters Patent of the United States is:

1. A method for optical interconnects, comprising:
   collimating a beam from a source with a first lens;
   steering the beam from the first lens with a first micro-prism toward a predetermined location on a curved reflecting surface;
   reflecting the beam from the curved reflecting surface to a second micro-prism;
   re-steering the beam at the second micro-prism to an orientation normal to the surface of a detector; and
   collecting the beam with a second lens onto the detector,
   wherein the first lens, first micro-prism and curved reflecting surface provide high-density, arbitrarily configured, point-to-point optical interconnects, and
   wherein the source, the first micro-prism, the second micro-prism, and the detector are all mounted to a substrate.

2. The method of claim 1, wherein the second micro-prism and second lens provide misalignment tolerance.

3. The method of claim 1, wherein the first lens and the second lens are micro-lenses.

4. The method of claim 1, wherein the curved reflecting surface is a spherically curved macro-mirror.

5. An optical interconnect method, the method comprising:
   steering a beam from a source with a first micro-prism toward a curved reflecting surface;
   reflecting the beam from the curved reflecting surface to a second micro-prism; and
   re-steering the beam at the second micro-prism for collection by a detector;
   wherein the first micro-prism, the curved reflecting surface, and the second micro-prism provide an optical interconnect, and
   wherein the source, the first micro-prism, the second micro-prism, and the detector are all mounted to a substrate.

6. The method of claim 5, wherein the second micro-prism provides misalignment tolerance.

7. The method of claim 5, wherein the curved reflecting surface is a spherically curved macro-mirror.

8. An apparatus for an optical link comprising:
   at least one lens;
   at least one micro-prism positioned adjacent the at least one lens, the at least one micro-prism for steering a beam; and
   a curved reflecting surface located at approximately one focal length from the at least one lens and the at least one micro-prism, and
   a substrate,
   wherein the at least one lens and the at least one micro-prism are mounted to the substrate.

9. The apparatus of claim 8, wherein the at least one lens is a micro-lens.

10. The apparatus of claim 8, wherein the curved reflecting surface is a spherically curved macro-mirror.

* * * * *